United States Patent
Janssens et al.

(10) Patent No.: US 10,488,516 B2
(45) Date of Patent: Nov. 26, 2019

(54) CONTROLLING AN OUTPUT SIGNAL INDEPENDENTLY OF THE FIRST HARMONIC

(71) Applicant: SEMICONDUCTOR COMPONENTS INDUSTRIES, LLC, Phoenix, AZ (US)

(72) Inventors: Johan Camiel Julia Janssens, Asse (BE); Pavel Horsky, Brno (CZ); Petr Kamenicky, Brno (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 717 days.

(21) Appl. No.: 15/092,982

(22) Filed: Apr. 7, 2016

(65) Prior Publication Data

US 2017/0115391 A1 Apr. 27, 2017

Related U.S. Application Data

(60) Provisional application No. 62/244,549, filed on Oct. 21, 2015.

(51) Int. Cl.
*G01S 15/93* (2006.01)

(52) U.S. Cl.
CPC ....... *G01S 15/931* (2013.01); *G01S 2015/932* (2013.01)

(58) Field of Classification Search
CPC ........ G01S 15/93; G01S 15/931; G01S 7/524; G01S 7/534; G01S 15/08; G01S 7/52004; G01S 2015/932; G01S 15/876
See application file for complete search history.

(56) References Cited

U.S. PATENT DOCUMENTS

| 4,825,425 A * | 4/1989 | Turner ................ G07F 17/246 368/7 |
| 4,864,547 A | 9/1989 | Krsna |
| 5,777,860 A | 7/1998 | Halbert |
| 6,590,460 B1 * | 7/2003 | Tenten ................ H03K 3/0307 331/109 |
| 2003/0164658 A1 | 9/2003 | Saraf |
| 2004/0254459 A1 * | 12/2004 | Kristoffersen ........ B06B 1/0215 600/437 |
| 2007/0282489 A1 * | 12/2007 | Boss ................ B62D 15/0285 701/2 |
| 2012/0323423 A1 * | 12/2012 | Nakamura ............ B60L 11/123 701/22 |

(Continued)

OTHER PUBLICATIONS

Chen, Ultrasonic imaging front-end design for CMUT: A 3-level 30Vpp pulse shaping pulser with improved efficiency and a noise-optimized (Year: 2012).*

(Continued)

*Primary Examiner* — Isam A Alsomiri
*Assistant Examiner* — Amie M Ndure
(74) *Attorney, Agent, or Firm* — Ramey & Schwaller, LLP

(57) ABSTRACT

A method includes configuring a transmitter to provide at least three output levels used to form an output signal. The method further includes adjusting a duration of at least one of the output levels to control an average value of the output signal independently of an amplitude of a first harmonic of the output signal.

17 Claims, 3 Drawing Sheets

(56) References Cited

U.S. PATENT DOCUMENTS

2013/0214937 A1* 8/2013 Petite .................... G01D 4/004
                                                    340/870.03
2014/0288793 A1* 9/2014 Tran .................. B60G 17/0165
                                                       701/70

OTHER PUBLICATIONS

Chen, Ultrasonic Imaging Transceiver Design for CMUT: A Three-Level 30-Vpp Pulse-Shaping Pulser With Improved Effciency and a Noise-Optimized Receiver, IEEE Journal of Solid-State Circuits, vol. 48, No. 11, Nov. 2013 (Year: 2013).*

* cited by examiner

CONTROLLING AN OUTPUT SIGNAL INDEPENDENTLY OF THE FIRST HARMONIC

CROSS-REFERENCE TO RELATED APPLICATION

This application claims priority to U.S. Provisional Application No. 62/244,549, filed on Oct. 21, 2015, entitled "CONTROLLING AN OUTPUT SIGNAL INDEPENDENTLY OF THE FIRST HARMONIC," invented by Johan Camiel Julia JANSSENS, Pavel HORSKY and Petr KAMENICKY, and is incorporated herein by reference and priority thereto for common subject matter is hereby claimed.

BACKGROUND

A transducer is a device that converts variations in a physical quantity, such as sound pressure level, into an electrical signal, and/or vice versa. Just as a transceiver may be used as both a transmitter and receiver, a transducer may be used both as an actuator and a sensor. When a transducer is used both as an actuator (e.g. transforming electrical energy into a transmitted sound pressure level) and as a sensor (e.g. transforming a received sound pressure level into an electrical quantity), often coupling capacitors are used to ensure independence of the output level at the transmitter from the input voltage at the receiver. This coupling capacitor adds to the material cost and the size of the printed circuit board ("PCB") required to accommodate the coupling capacitor. Additionally, the coupling capacitor introduces attenuation (either transmission loss, reception loss, or both) and decreasing sensitivity at the system level. Next, the coupling capacitor often introduces settling time issues into the system due to the fact that the coupling capacitor needs to discharge or charge in order to accommodate different voltages during transmission and during reception. Finally, the coupling capacitor often needs a precharge cycle between transmission and reception, which may lead to parasitic behavior in the system.

Additionally, regulators are often used to regulate the output of sound pressure levels ("SPLs") for certain transducer applications. However, each transducer in the system usually has a corresponding regulator used to calibrate sensitivity or to compensate for variations in the output driver supply voltage. Accordingly, there is an undesirable correlation between the number of sensors in the system and the number of regulators.

SUMMARY

Accordingly, systems and methods for controlling an output circuit independently of the first harmonic, and vice versa, are disclosed herein. In doing so, the coupling capacitor may be eliminated thus saving cost and adding system-wide efficiency.

In at least one embodiment, a method includes configuring a transmitter to provide at least three output levels used to form an output signal. The method further includes adjusting a duration of at least one of the output levels to control an average value of the output signal independently of an amplitude of a first harmonic of the output signal.

In another embodiment, a system includes at least one transmitter configured to provide at least three output levels used to form an output signal and configured to adjust a duration of at least one of the output levels to control an average value of the output signal independently of an amplitude of a first harmonic of the output signal. The system further includes one or more receivers configured to receive an input signal based on reflection of the output signal by an obstacle. The system further includes logic configured to measure distance based on the input signal.

In yet another embodiment, a method includes configuring a transmitter to provide at least three output levels used to form an output signal. The method further includes adjusting a duration of at least one of the output levels to control an amplitude of a first harmonic of the output signal independently of an average value of the output signal.

The following features may be incorporated into the various embodiments. A duration of at least one of the output levels may be adjusted to control the amplitude of the first harmonic of the output signal independently of the average value of the output signal. The duration may be adjusted such that the average value is within a range needed by a receiver. Adjusting the duration may be based on monitoring a transmitter supply voltage. The transmitter may include a transducer. The duration may be adjusted based on stored calibration coefficients for the transducer. Excitation of higher order resonances in the transducer may be minimized. The transmitter may be further configured to adjust a duration of at least one of the output levels to control the amplitude of the first harmonic of the output signal independently of the average value of the output signal. An automobile may include the transmitter, the one or more receivers, and the logic. The distance may include a distance between the automobile and the obstacle. A parking assist system may include the transmitter, the one or more receivers, and the logic. The transmitter may include a transducer coupled to an output signal generator without a separate coupling capacitor electrically in between the transducer and the output signal generator. The transmitter may include a negative voltage generator. The negative voltage generator may include a charge pump configured to provide a positive voltage signal and a negative voltage signal. Two or more transmitters may use a common high voltage supply. A duration of at least one of the output levels may be adjusted to control the average value of the output signal independently of the amplitude of the first harmonic of the output signal. The output signal may be a sonic signal, and the duration may be adjusted to control a sound pressure level of the output signal. The transmitter may include a transducer, and the duration may be adjusted based on stored calibration coefficients for the transducer. The transmitter may include a transducer, and the duration may be adjusted to minimize excitation of higher order resonances in the transducer.

BRIEF DESCRIPTION OF THE DRAWINGS

Systems and methods for controlling an output circuit independently of the first harmonic are disclosed herein. In doing so, the coupling capacitor may be eliminated saving cost and adding system-wide efficiency. In the drawings.

Figure 1:
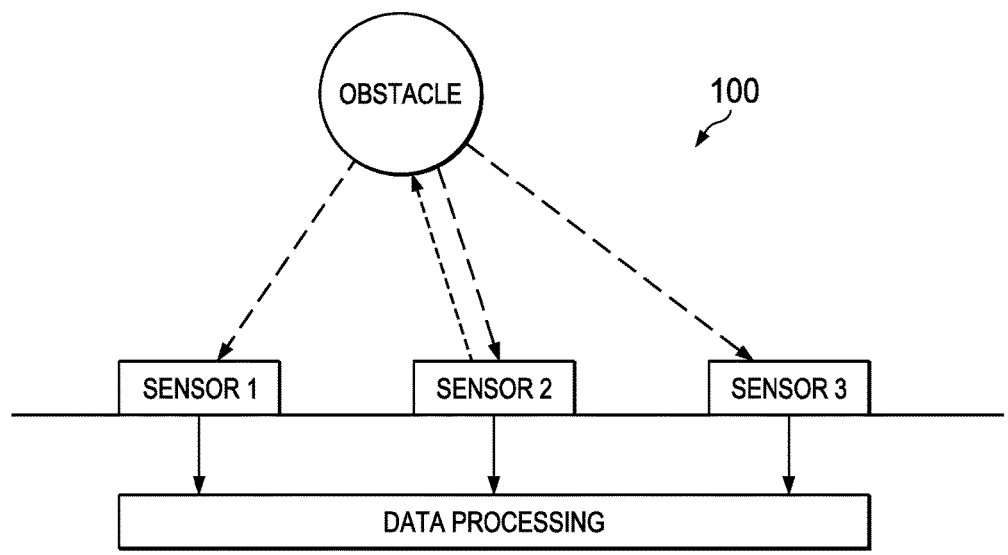
FIG. 1 is a diagram of an illustrative parking assist application capable of independent circuit control.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

Using the systems and methods disclosed herein, the coupling capacitor may be eliminated saving cost and adding system-wide efficiency. Specifically, the material cost will be reduced, and the size of the printed circuit board ("PCB") required will be reduced. Additionally, no attenuation (either transmission loss, reception loss, or both) will be introduced and sensitivity at the system level will not be decreased. Next, settling time issues due to charging and discharging times will be eliminated. Finally, parasitic behavior in the system will be eliminated due to elimination of precharge cycles.

Transducers are used in many applications, and for clarity of discussion, the systems and methods will be described as applied to parking assist technology; however, a person having ordinary skill in the art will recognize that the following disclosure is applicable to any application in which transducers are used. By configuring a transmitter (coupled to or including a transducer) to provide at least three output levels, the duration of the output levels may be adjusted to control an average value of the output signal independently of an amplitude of a first harmonic of the output signal, and vice versa. Specifically, the amount of time in the ground, neutral, or 0 state may be adjusted as desired without the need for tradeoffs necessary in a two output level system. Such adjustment enables the elimination of the coupling capacitor and the corresponding benefits without introducing a transformer.

FIG. 1 is a diagram of an illustrative transformer-less parking assist application including a system 100 for independent control of the output signal. Sensors 1, 2, 3 each include transducers that may be used both as an actuator and a sensor. Specifically, each sensor is capable of transmitting a sonic and/or ultrasonic signal based on electrical energy, receiving a sonic and/or ultrasonic signal, and transforming or converting the received signal into an electrical quantity. Here, the sensors are shown on the same plane (e.g. an automobile bumper), but in various embodiments the sensors are on different planes and calculations performed in hardware, software, or both account for the spatial differences. In this example, sensor 2 emits an ultrasonic signal, which strikes an obstacle. The obstacle may be of the kind encountered in the parking context such as another automobile, curb, tree, pole, or sign. The obstacle reflects the signal in various directions, and reflected signals are received by each of the sensors 1, 2, 3. Based on the characteristics of the received signals, including time elapsed between transmission and reception, characteristics of the environment and obstacle may be determined by data processing logic using hardware (e.g. circuitry logic), software, or both. For example, the distance to the obstacle, shape of the obstacle, time until the obstacle is reached, position of the obstacle in space, and the like may be determined. Data processing logic may be coupled to sensors 1, 2, 3 by a wired connection or wireless connection, and may periodically obtain measurement data from the sensors 1, 2, 3 as a function of position and/or time. Among other things, the logic processes data received from the sensors 1, 2, 3 and generates an appropriate output, such as an audio or visual alert. Software may be run by the data processing logic to collect the data and organize it in a file or database. Specifically, one or more processors coupled to memory may execute the software. The one or more processors may perform any appropriate process, step, or action described below or may control circuitry that does so. The software may process the data to optimize parking assist operations or any other transducer applications as described below. In at least one embodiment, the data processing logic is located within a housing able to protect the logic from the environment. The data processing logic may be dedicated to parking assist technology within an automobile or may also be used for other automobile processes in various embodiments.

The transmitter of each sensor should be calibrated to produce a defined sound pressure level ("SPL") in order to ensure a defined sensitivity of the system 100. Calibration is useful for indirect measurements where one sensor is used to transmit and several sensors are used to receive. For an n-level transmitter, where n is at least three, the SPL may be regulated or adjusted using duty cycle control. For example, the SPL may be adjusted by adjusting the amplitude of the first harmonic signal, while the average value of the output signal may be adjusted to fit common mode input signal range of the receiver or other elements that are coupled to the transducer, e.g., a damping element. Specifically, the duration of the output levels may be adjusted to control an average value of the output signal independently of an amplitude of a first harmonic of the output signal. The duration of the output levels may also be adjusted to control the amplitude of the first harmonic of the output signal independently of the average value of the output signal. Because the transducer of sensor 2 is used for transmitting and receiving, the transducer should remain biased, but at a low enough level to accurately measure the received signal. Accordingly, a low noise amplifier may be used as described with respect to FIG. 2.

Figure 2:
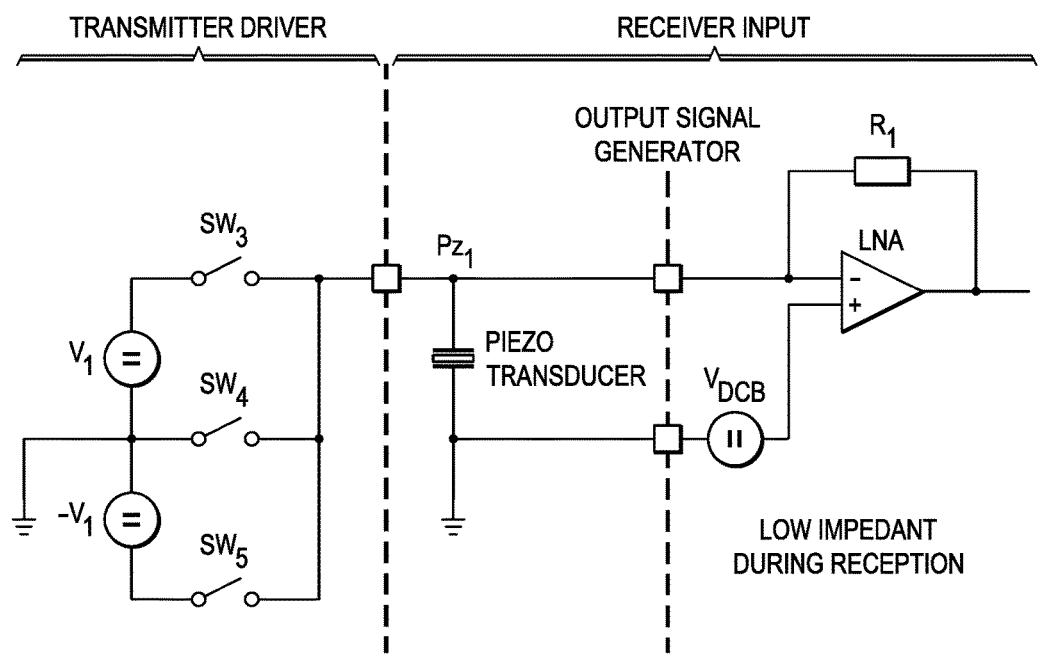
FIG. 2 is an illustrative circuit diagram that may be implemented in a system capable of independent circuit control.

FIG. 2 is an illustrative transformer-less circuit diagram that may be implemented in the system 100 of FIG. 1. Although FIG. 2 is described with respect to a three level transmitter, higher levels may be implemented similarly. Here, the three levels are provided by voltage sources $V_1$, $-V_1$, and a ground state. The voltage sources along with switches $SW_3$, $SW_4$, and $SW_5$, make up the transmitter or transducer driver. Switch $SW_3$ is associated with the voltage source $V_1$, switch $SW_4$ is associated with the ground state, and switch $SW_5$ is associate with the voltage source $-V_1$. Only one switch is closed or switched on at a time, and the voltage associated with that switch is provided to the transducer $Pz_1$. In an alternative embodiment, the circuitry includes a negative voltage generator implemented as a charge pump that provides a positive voltage signal and a negative voltage signal.

The transducer $Pz_1$ is a piezoelectric device as shown, but may be any number of types of transducers in various embodiments. The receiver input circuitry includes a low-noise amplifier (sometimes called a low-voltage transimpedance amplifier) that receives as input the received signal and a reference voltage $V_{DCB}$. As such, the level on the transducer $Pz_1$ should be regulated to a low, but non-zero, value for operation of the amplifier.

Other transmitters or transmitter drivers may be implemented with the same or similar circuitry. By adjusting the duty cycle, a regulated transmitter supply voltage ($V_1$ and $-V_1$) is not necessary for each sensor or transducer. Adjustment of SPL of each transducer may be performed by adjusting the amplitude of the first harmonic component of the driving signal. In this way, two or more transmitters may use a common supply voltage in various embodiments without a transformer.

Figure 3:
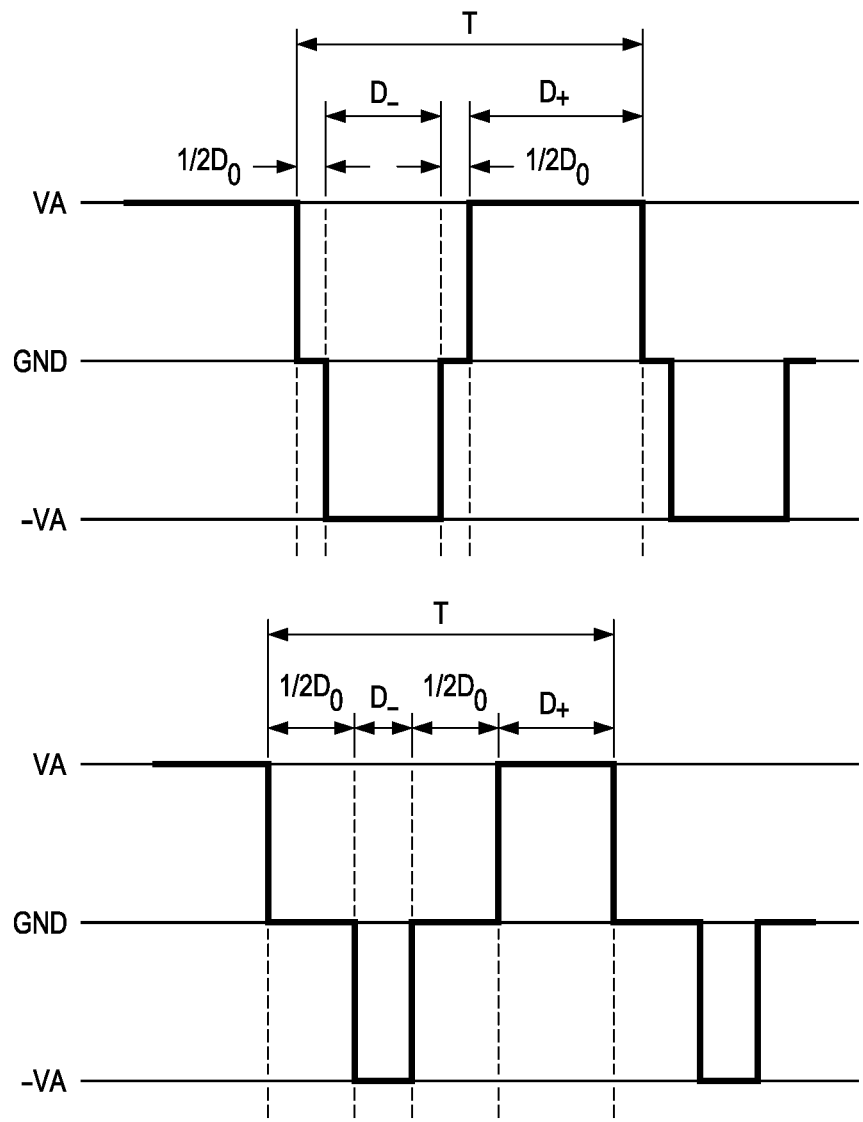
FIG. 3 is charts of output levels illustrative of independent circuit control.

FIG. 3 shows charts of output levels illustrative of independent circuit control. For clarity of discussion, $-V_A$ and $V_A$ are the positive and negative output level peaks respectively, while GND is the ground state output level. In the examples used herein, $V_A$ and $-V_A$ have the absolute value but a different sign. However, in various embodiments the peaks will not have the same absolute value but will have different absolute values. Those having ordinary skill in the art may generalize the levels or set the ground state outside the bounds of $-V_A$ and $V_A$. Additionally, $V_A$ in FIG. 3 may correspond to $V_1$ in FIG. 2 in various embodiments. Furthermore, the use of square waves between $-V_A$ and $V_A$ allows for efficient excitation of the transducer because the peak-to-peak amplitude of the fundamental frequency that is present is $4/\pi$ times larger than the peak-to-peak amplitude of the square wave. The total amount of time, T, for one period of the transmission may be divided into time spent transmitting $-V_A$, $D_-$, time spent transmitting $V_A$, $D_+$, and time spent transmitting the ground level, $D_0$. Here, there are two portions of time spent transmitting the ground level, and each portion is ½ $D_0$. For clarity of discussion, these simple and continuous peaks are used. In other embodiments, $D_+$, $D_-$, and $D_0$ may be divided among T in as many increments as desired, with as many transitions between the increments as desired. Additionally, pulse width modulation, sigma delta modulation, or any other modulation scheme may be implemented.

The three or more output levels mitigate the high sensitivity of the system to duty cycle variations. Accordingly, when directly connecting a transmitter producing this waveform to a transducer, the average output level of the transducer will converge to (when considering $V_A=-(-V_A)$):

$$V_{DCB}=V_A(D_+-D_-)+V_0D_0 \quad (1)$$

where $D_++D_-+D_0=100\%$. When $V_0$ is ground, equation (1) becomes:

$$V_{DCB}=V_A(D_+-D_-) \quad (2)$$

The amplitude of the fundamental or the first harmonic ($V_F$) that is present in this signal is now equal to:

$$V_F=V_A(2/\pi)(\sin(\pi D_+)+\sin(\pi D_-)) \quad (3)$$

As a result, the average output level can be controlled by the differential between the $D_+$ and $D_-$ duty cycles, whereas the power can be controlled independently by the common components in $D_+$ and $D_-$. In other words, the amplitude of the first harmonic of the output signal can be controlled independently or substantially independently of the average value of the output signal and vice versa. The waveform on the left of FIG. 3 generates the very same $V_{DCB}$ value as the waveform on the right of FIG. 3, albeit at a very different power level or amplitude of the first harmonic component. Numerically, this can be understood by rewriting equation (3):

$$V_F=V_A(2/\pi)(\sin((\pi/2)(D_++D_-))\cos((\pi/2)(D_+-D_-))) \quad (4)$$

For a given $V_A$, $(D_+-D_-)$, and $(D_++D_-)$, the timing for transmitting the GND level that maximizes the energy of the fundamental, is at the zero crossings of the fundamental component that is present in the waveform. As such, for small values of $(D_+-D_-)$, corresponding to small $V_{DCB}$ values, the smallest $D_+$ or $D_-$ cycle is preferably flanked by ½ $D_0$ transmissions. Although preferable, this embodiment is not necessary to achieve the efficiencies disclosed herein. In this way, a coupling capacitor need not be present to ensure the independence between the output level of the transmitter and the input voltage of the receiver.

For small values of $(D_+-D_-)$, the fundamental amplitude is relatively insensitive to the exact position (or distribution in time) of the $D_0$ duty cycle time. Therefore, its timing may be chosen taking into account other considerations such as topological constraints, timing of charge/dump cycles in a charge pump, synchronization with other circuits, etc. For example, the positioning in the time domain of the different output levels of the transmitter may be chosen to minimize excitation of high Q-factor modes in the transducer. Additionally, the phase of the transmission edges may be modulated to more uniformly spread out the energy of the high frequency harmonics in the frequency domain. Also, the frequency component of the transmission may be minimized around a particular frequency.

Figures 4, 5:
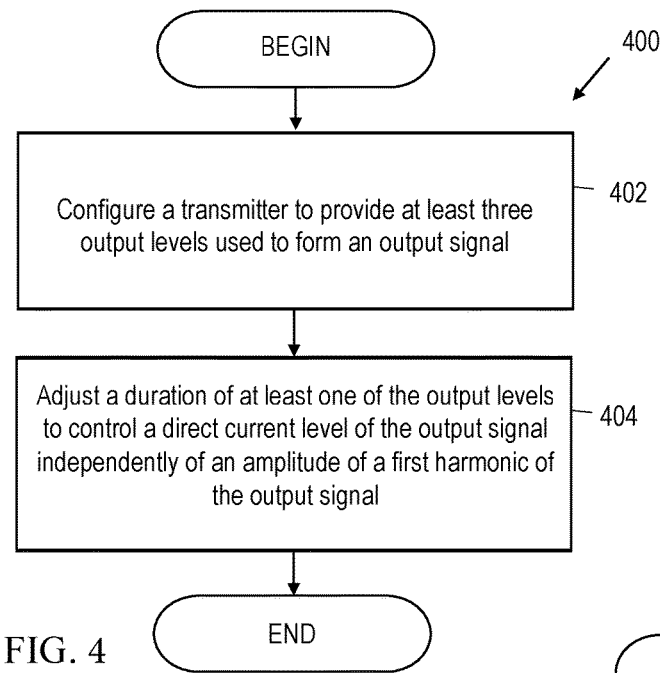
FIG. 4 is a flow diagram of an illustrative method of independent circuit control.
FIG. 5 is a flow diagram of another illustrative method of independent circuit control.

FIG. 4 is a flow diagram of an illustrative method 400 of independent circuit control. At 402, a transmitter is configured to provide at least three output levels used to form an output signal. At 404, a duration of at least one of the output levels is adjusted to control an average value of the output signal independently of an amplitude of a first harmonic of the output signal. The method may also include adjusting a duration of at least one of the output levels to control the amplitude of the first harmonic of the output signal independently of the average value of the output signal. The duration may be adjusted such that the average value is within a range needed by a receiver. For example, if the input common mode or average voltage level of the receiver is known, the average level of the output signal may be adjusted to fit in the level of the receiver. Also, the duration may be adjusted based on monitoring a transmitter supply voltage. For example, there are often analog-to-digital converters ("ADCs") present in park assist integrated circuits. Such an ADC, or an independent one specific for this task, may be used to measure the supply voltage immediately before transmission. The ADC may also be used during transmission to check for supply voltage variations. Based on the supply voltage measurement, the transmitter duty cycle may be adjusted. For example, for a supply voltage, $V_A$, the duty cycles $D_+$ and $D_-$ may be calculated once before the transmission or repeatedly during the transmission. Alternatively, the receiver gain may be adjusted. Specifically, if all transducers are supplied by the same supply voltage, it is possible to use the receiver gain adjustment for indirect measurements and duty cycle regulation for calibration of sensitivity of each individual transducer.

Adjusting the duration may be based on stored calibration coefficients for the transducer. Specifically, calibration of the sensors may be performed during the manufacturing end of line tests, and the sensitivity data may be stored in nonvolatile memory. Before transmission, these data are read, and duty cycle adjustment may be based on the sensitivity data.

FIG. 5 is a flow diagram of another illustrative method 500 of independent circuit control. At 502, a transmitter is configured to provide at least three output levels used to form an output signal. At 504, a duration of at least one of the output levels is adjusted to control an amplitude of a first harmonic of the output signal independently of an average value of the output signal. The method may further include adjusting a duration of at least one of the output levels to control the average value of the output signal independently of the amplitude of the first harmonic of the output signal. The output signal may be a sonic signal, and the duration may be adjusted to control a SPL of the output signal.

The duration may be adjusted based on stored calibration coefficients for the transducer. Specifically, calibration of the sensors may be performed during the manufacturing end of line tests, and the sensitivity data may be stored in nonvolatile memory. Before transmission, these data are read, and duty cycle adjustment may be based on the sensitivity data. Adjusting the duration may include minimizing excitation of higher order resonances in the transducer. Minimizing excitation of higher order resonances may be performed by adjusting the timing such that for a part of the period the dominant higher resonances are excited with one phase and for a second part of the period with an opposite phase resulting in minimizing of excitation of the higher resonances. A similar effect may be obtained by modulating or jittering the phase of the fundamental, resulting in frequency spreading of the higher harmonics.

Often, there are ADCs present in park assist integrated circuits. Such an ADC, or an independent one specific for this task, may be used to measure the supply voltage immediately before transmission. The ADC may also be used during transmission to check for supply voltage variations. Based on the supply voltage measurement, the transmitter duty cycle may be adjusted. Alternatively, the receiver gain may be adjusted. Specifically, if all transducers are supplied by the same supply voltage, it is possible to use the receiver gain adjustment for indirect measurements.

In this way, the coupling capacitor may be eliminated, saving cost and adding system-wide efficiency. Specifically, the material cost will be reduced, and the size of the PCB required will be reduced. Additionally, no attenuation (either transmission loss, reception loss, or both) will be introduced and sensitivity at the system level will not be decreased. Next, settling time issues due to charging and discharging times will be eliminated. Finally, parasitic behavior in the system will be eliminated due to elimination of precharge cycles.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. An integrated circuit comprising:
   a transmitter that cyclically forms an output signal using at least three voltage states, the output signal having:
      an average value $V_{DCB}$;
      an amplitude $V_F$ of a fundamental frequency component; and
      a period T of the fundamental frequency component, the period T including:
         a duration $D_0$ of an intermediate state voltage;
         a duration $D_+$ of a high state voltage above the intermediate state voltage; and
         a duration $D_-$ of a low state voltage below the intermediate state voltage; and
   processing logic that controls the average value $V_{DCB}$ by adjusting at least one of duration $D_+$ and duration $D_-$ to vary a difference therebetween.

2. The integrated circuit of claim 1, further comprising a receiver with an input terminal configured to directly connect with a piezoelectric transducer driven by the output signal, the average value $V_{DCB}$ corresponding to a desired DC bias for the input terminal.

3. The integrated circuit of claim 1, wherein the processing logic further controls the amplitude $V_F$ by adjusting at least one of duration $D_+$ and duration $D_-$ to vary their sum.

4. The integrated circuit of claim 3, wherein the processing logic controls the amplitude $V_F$ by varying both duration $D_+$ and duration $D_-$ to maintain the difference therebetween.

5. The integrated circuit of claim 3, wherein the processing logic controls the amplitude $V_F$ by measuring a supply voltage and responsively adjusting at least one of duration $D_+$ and duration $D_-$.

6. The integrated circuit of claim 5, wherein the intermediate state voltage is a ground voltage, the high state voltage is a positive voltage, and the low state voltage is a negative voltage, and wherein the integrated circuit comprises a charge pump that provides both the positive and negative voltages.

7. A method that comprises manufacturing an integrated circuit having:
   a transmitter that cyclically forms an output signal using at least three voltage states, the output signal having:
      an average value $V_{DCB}$;
      an amplitude $V_F$ of a fundamental frequency component; and
      a period T of the fundamental frequency component, the period T including:
         a duration $D_0$ of an intermediate state voltage;
         a duration $D_+$ of a high state voltage above the intermediate state voltage; and
         a duration $D_-$ of a low state voltage below the intermediate state voltage; and
   processing logic that controls the average value $V_{DCB}$ by adjusting at least one of duration $D_+$ and duration $D_-$ to vary a difference therebetween.

8. The method of claim 7, wherein the integrated circuit further includes a receiver with an input terminal configured to directly connect with a piezoelectric transducer driven by the output signal, the average value $V_{DCB}$ corresponding to a desired DC bias for the input terminal.

9. The method of claim 7, wherein the processing logic further controls the amplitude $V_F$ by adjusting at least one of duration $D_+$ and duration $D_-$ to vary their sum.

10. The method of claim 9, wherein the processing logic controls the amplitude $V_F$ by varying both duration $D_+$ and duration $D_-$ to maintain the difference therebetween.

11. The method of claim 9, wherein the processing logic controls the amplitude $V_F$ by measuring a supply voltage and responsively adjusting at least one of duration $D_+$ and duration $D_-$.

12. The method of claim 11, wherein the intermediate state voltage is a ground voltage, the high state voltage is a positive voltage, and the low state voltage is a negative voltage, and wherein the integrated circuit comprises a charge pump that provides both the positive and negative voltages.

13. A method comprising:
cyclically forming an output signal using at least three voltage states, the output signal having:
   an average value $V_{DCB}$;
   an amplitude $V_F$ of a fundamental frequency component; and
   a period T of the fundamental frequency component, the period T including:
      a duration Do of an intermediate state voltage;
      a duration $D_+$ of a high state voltage above the intermediate state voltage; and
      a duration $D_-$ of a low state voltage below the intermediate state voltage; and
controlling the average value $V_{DCB}$ by adjusting at least one of duration $D_+$ and duration $D_-$ to vary a difference therebetween.

14. The method of claim 13, further comprising applying the output signal to a piezoelectric transducer terminal, the terminal being electrically connected to a receiver input without a coupling capacitor.

15. The method of claim 13, further comprising:
controlling the amplitude $V_F$ by adjusting at least one of duration $D_+$ and duration $D_-$ to vary their sum.

16. The method of claim 15, wherein controlling the amplitude $V_F$ is performed by varying both duration $D_+$ and duration $D_-$ to maintain the difference therebetween.

17. The method of claim 15, wherein controlling the amplitude $V_F$ includes measuring a supply voltage and responsively adjusting at least one of duration $D_+$ and duration $D_-$.

\* \* \* \* \*